US011850818B2

(12) United States Patent
Chan et al.

(10) Patent No.: US 11,850,818 B2
(45) Date of Patent: Dec. 26, 2023

(54) SMART BALER (71) Applicant: WM INTELLECTUAL PROPERTY HOLDINGS, L.L.C., Houston, TX (US)

(72) Inventors: Chung Wah Chan, Houston, TX (US); Ricardo J. Perez, Houston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/105,680

(22) Filed: Feb. 3, 2023

(65) Prior Publication Data
US 2023/0286239 A1 Sep. 14, 2023

Related U.S. Application Data (60) Continuation of application No. 17/025,852, filed on Sep. 18, 2020, now Pat. No. 11,571,869, which is a
(Continued)

(51) Int. Cl.
*B30B 9/30* (2006.01)
*G06F 16/22* (2019.01)
*G06F 16/954* (2019.01)

(52) U.S. Cl.
CPC ............ *B30B 9/3007* (2013.01); *G06F 16/22* (2019.01); *G06F 16/954* (2019.01)

(58) Field of Classification Search
CPC .......... A01F 15/04; A01F 15/07; A01F 15/08; A01F 15/02; A01F 15/005; A01F 15/00;
(Continued)

(56) References Cited

U.S. PATENT DOCUMENTS 4,236,222 A * 11/1980 Loshbough .......... G01G 19/414
177/1
4,362,097 A * 12/1982 Rogers ................ A01F 15/0833
100/88
(Continued)

FOREIGN PATENT DOCUMENTS

GB 2488996 9/2012
WO 2018/057126 3/2018

OTHER PUBLICATIONS

The International Bureau of WIPO; PCT International Preliminary Report on Patentability, issued in connection to application PCT/US2017/045278; dated Mar. 5, 2019; 9 pages; Switzerland.
(Continued)

*Primary Examiner* — Bobby Yeonjin Kim
(74) *Attorney, Agent, or Firm* — Greenberg Traurig LLP (57) ABSTRACT Disclosed are embodiments of a system and method for baling recyclable materials and managing the baling of recyclable materials. The apparatus for baling includes a baler for compressing and baling recyclable materials, a scale, label printer, and a processor. Certain embodiments further comprise at least one digital camera, RFID dispenser, and an internet connection that allows the processor to transmit collected data to a remote database for further analysis.

The disclosed method for baling recyclable materials comprising the steps of baling materials; weighing the bale automatically using a digital scale operably connected to the processor; recording the weight of the bale automatically; and printing a label which displays the recorded weight of the bale. Additionally, the method may comprise inputting information and/or automatically recording data, and/or automatically transmitting the data associated with a bale to a remote database.

6 Claims, 6 Drawing Sheets

Related U.S. Application Data division of application No. 15/250,359, filed on Aug. 29, 2016.

(58) Field of Classification Search
CPC .......... A01F 17/00; A01F 19/00; A01F 21/00; A01F 2015/0891; A01D 89/006; G06F 17/30873; G06F 17/30312; B30B 9/30; B30B 9/3007

See application file for complete search history.

(56) References Cited

U.S. PATENT DOCUMENTS

| | | | | |
|---|---|---|---|---|
| 4,742,880 | A * | 5/1988 | Schrag | A01F 15/0875 177/136 |
| 6,021,712 | A * | 2/2000 | Harrop | B30B 9/3007 100/229 A |
| 6,123,017 | A * | 9/2000 | Little | B30B 9/3007 702/140 |
| 6,138,557 | A * | 10/2000 | Brown | B30B 9/3096 53/529 |
| 6,593,853 | B1 * | 7/2003 | Barrett | G06K 17/0025 340/572.1 |
| 6,633,798 | B2 * | 10/2003 | Daniel | B65B 27/12 700/275 |
| 7,146,294 | B1 * | 12/2006 | Waitkus, Jr. | G01G 23/3728 340/613 |
| 7,406,402 | B1 | 7/2008 | Waitkus, Jr. | |
| 7,685,192 | B1 * | 3/2010 | Scofield | G06F 16/954 707/709 |
| 7,728,730 | B2 | 6/2010 | Langlois et al. | |
| 7,743,699 | B1 * | 6/2010 | Freeman | A01F 15/0816 56/341 |
| 7,957,937 | B2 | 6/2011 | Waitkus, Jr. | |
| 8,046,192 | B2 * | 10/2011 | McClain | G05B 23/0267 702/182 |
| 8,285,681 | B2 * | 10/2012 | Prahlad | G06F 3/0667 707/640 |
| 8,371,214 | B1 * | 2/2013 | Correale, Jr. | F16P 3/08 100/48 |
| 8,392,135 | B2 * | 3/2013 | McClain | G01G 11/006 702/182 |
| 10,377,518 | B2 | 8/2019 | Waite et al. | |
| 10,564,029 | B2 | 2/2020 | Waite et al. | |
| 11,148,383 | B2 | 10/2021 | Waite et al. | |
| 11,162,834 | B2 | 11/2021 | Waite et al. | |
| 11,241,854 | B2 | 2/2022 | Waite et al. | |
| 11,571,869 | B2 | 2/2023 | Chan et al. | |
| 11,780,190 | B2 | 10/2023 | Chan et al. | |
| 2002/0108507 | A1 * | 8/2002 | May | B65F 1/1638 700/229 |
| 2003/0028289 | A1 * | 2/2003 | Daniel | B65B 57/00 701/1 |
| 2005/0280537 | A1 * | 12/2005 | Feltz | G06K 1/121 340/572.1 |
| 2006/0080819 | A1 * | 4/2006 | McAllister | G06K 17/00 29/403.3 |
| 2007/0209530 | A1 * | 9/2007 | Viaud | A01F 15/08 100/88 |
| 2008/0197194 | A1 * | 8/2008 | Flood | B30B 9/3042 235/385 |
| 2010/0011717 | A1 * | 1/2010 | Rivard | B30B 9/3003 53/528 |
| 2010/0116881 | A1 * | 5/2010 | Flood | G06Q 50/26 235/380 |
| 2010/0299097 | A1 * | 11/2010 | Threlkeld | B30B 9/3007 707/802 |
| 2012/0048129 | A1 * | 3/2012 | Smith | A01F 15/08 235/375 |
| 2013/0008324 | A1 * | 1/2013 | Verhaeghe | A01F 15/0825 100/99 |
| 2014/0156541 | A1 * | 6/2014 | Waite | G01G 21/22 705/308 |
| 2014/0157999 | A1 * | 6/2014 | Verhaeghe | B65C 3/02 100/29 |
| 2015/0379785 | A1 * | 12/2015 | Brown, Jr. | G07C 5/08 701/29.1 |
| 2016/0023417 | A1 * | 1/2016 | Hanson | B30B 9/3007 100/99 |
| 2016/0081276 | A1 * | 3/2016 | Riesterer | D06M 15/00 700/275 |
| 2016/0187185 | A1 * | 6/2016 | Smith | G01G 19/08 177/1 |
| 2017/0008671 | A1 * | 1/2017 | Whitman | B60P 1/00 |
| 2018/0056618 | A1 | 3/2018 | Chan et al. | |
| 2021/0170707 | A1 | 6/2021 | Chan et al. | |

OTHER PUBLICATIONS

United States Patent and Trademark Office; PCT Written Opinion of the International Searching Authority, issued in connection to application PCT/US2017/045278; dated Nov. 2, 2017; 8 pages; US.

United States Patent and Trademark Office; PCT International Search Report, issued in connection to application PCT/US2017/045278; dated Nov. 2, 2017; 3 pages; US.

Mexican Institute of Industrial Property; Office Action, issued in connection to application No. MX/a/2019/002485; 5 pages; dated Apr. 30, 2019; Mexico.

Mexican Institute of Industrial Property; Office Action, issued in connection to application No. MX/a/2019/002485; 4 pages; dated Nov. 27, 2019; Mexico.

Mexican Institute of Industrial Property; Office Action, issued in connection to application No. MX/a/2019/002485; 4 pages; dated Aug. 25, 2023; Mexico.

* cited by examiner

SMART BALER

CROSS REFERENCES

This application is a continuation application of, and claims the benefit of, U.S. application Ser. No. 17/025,852, filed Sep. 18, 2020, which is a divisional application of, and claims the benefit of U.S. patent application Ser. No. 15/250,359, filed Aug. 29, 2016, the disclosures of which are incorporated herein.

FIELD

Embodiments described herein are employed for automatic data gathering from a baling device or floor scale. Embodiments allow for increased efficiency when handling recyclable materials.

BACKGROUND AND SUMMARY

The invention allows automatic data gathering from any baling devices or floor scales via information technology, so that collected data can be used to increase material handling efficiency by eliminating scaling of bale weights via a floor scale, eliminate human hand writing recording errors, eliminate wrong material reporting, eliminate false data, add visibility of balers productivity, add visibility to knowing who baled what material, when material is baled, at which location material is baled, etc.

Traditionally, each of the above steps has been addressed by a human operator manually recording notes. The traditional system is generally susceptible to both accidental and intentional human error. This error frequently leads to inaccurate reporting of bale weight and type of material baled. This also leads to inconsistent bale weights, lack of inventory control, and false records.

Disclosed embodiments address these problems by integrating weight sensors, computer processors, cameras and other sensing devices with the baler. The detected weight is then processed through a mathematical algorithm and pushed to a cloud database. At that point, a local computer can capture the weight data as well as an image of product baled and print a label, barcode, QR code, RFID and/or other tracking device to be affixed to the bale.

When recyclable materials are collected and baled, disclosed embodiments allow for efficient, accurate labeling of each bale with the weight, type of material, baling location, bar code tracker and other useful information. Embodiments also allow this information to be transferred to a database where the information may be used for auditing and optimization of the total process. Access to this data will help users better manage their recycling operations. This will also help users compare the quantity of recycled materials to the total amount of materials available to be recycled and may reveal additional revenue streams.

Potential benefits of the disclosed embodiments relate to automatic weighing of finished bales; eliminating multiple trips to obtain weight; instant and accurate inventory report on baled goods; eliminating the need for a human weight report; eliminating human hand writing error; and/or eliminating inventory errors.

Additional benefits relate to allowing an owner to set the tolerance of bale weight for each type of material; letting an owner know when baling wires are running low; letting an owner know when the baler needs service; letting an owner know when full load is close, facilitating the pre-scheduling of load pick up; customized alerts can be sent to an owner (and multiple other designated personnel) based on pre-defined criteria; multi-layer password protection; optional camera to capture images of the material being baled; and/or an optional printer to print a bale label with bar codes and all relevant information of the bale content.

DETAILED DESCRIPTION

Disclosed embodiments allow automatic data gathering from baling devices or scales via integrated computer processors and sensors. These embodiments help ensure that collected data can be used to increase material handling efficiency. This is done by eliminating the need to weigh bales via a separate floor scale, as well as eliminating human hand writing recording errors, wrong material reporting and false data. Disclosed embodiments also add transparency to the measurements of baler 101 productivity, identifying employee baled which materials, knowing when a material was baled, knowing at what location a material was baled, etc. Disclosed embodiments may encompass, without limitation, horizontal and vertical balers.

Baling devices commonly include a large hollow space enclosed by a safety gate 125 and a door 120. Material is loaded into the empty space and compressed, frequently by the action of a piston 105. Some balers 101 utilize a safety mechanism which requires the door 120 to be locked using a door lock wheel 115 or other mechanism prior to compressing the material in to a bale. Balers 101 commonly have floor gaps 135 which facilitate the insertion of baling wire under the compressed material so that the bale can be tied and completed. Balers 101 are commonly controlled by a standard control panel 110 which contains piston controls 320, a power indicator 305, a power disconnect 315, and/or a panel door lock 215.

Figure 1:
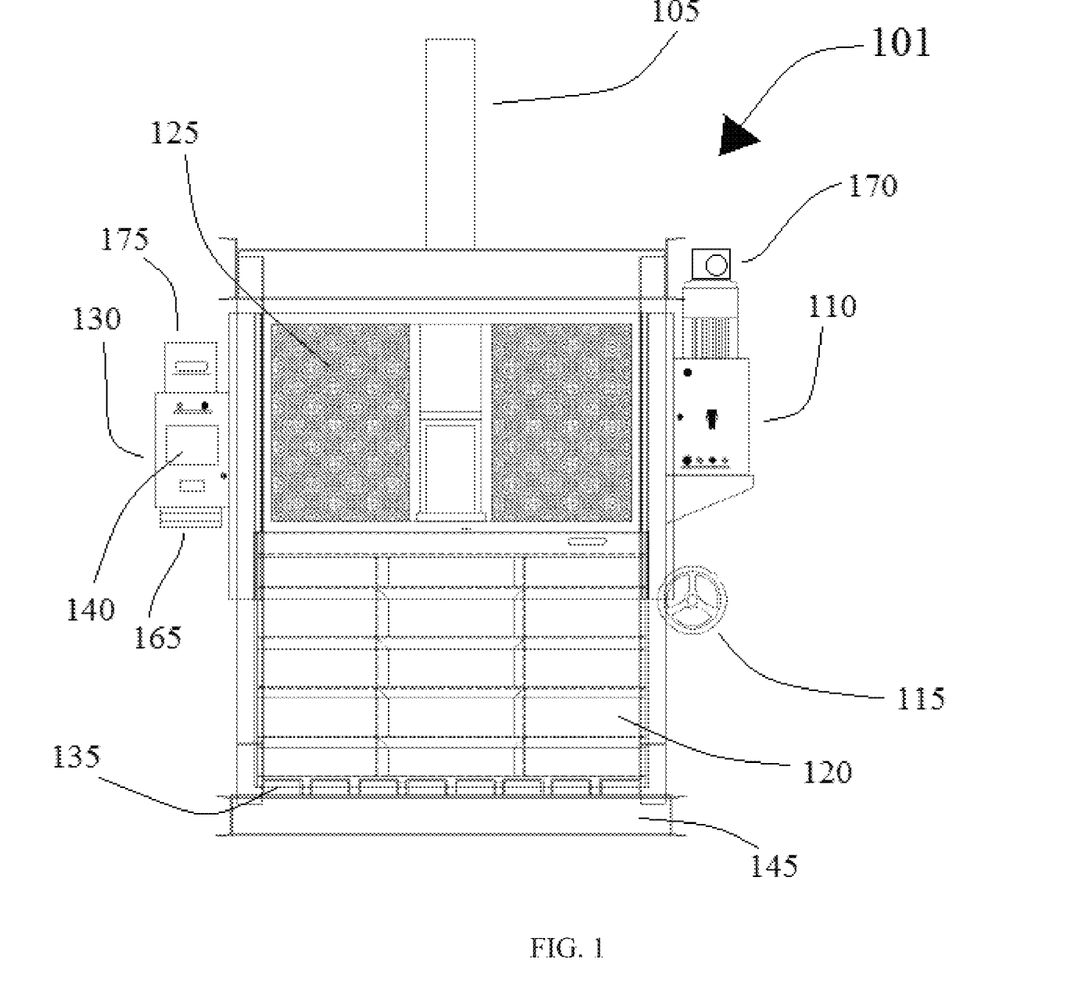
FIG. 1 shows a front view of an embodiment of a smart baler.
Figure 2:
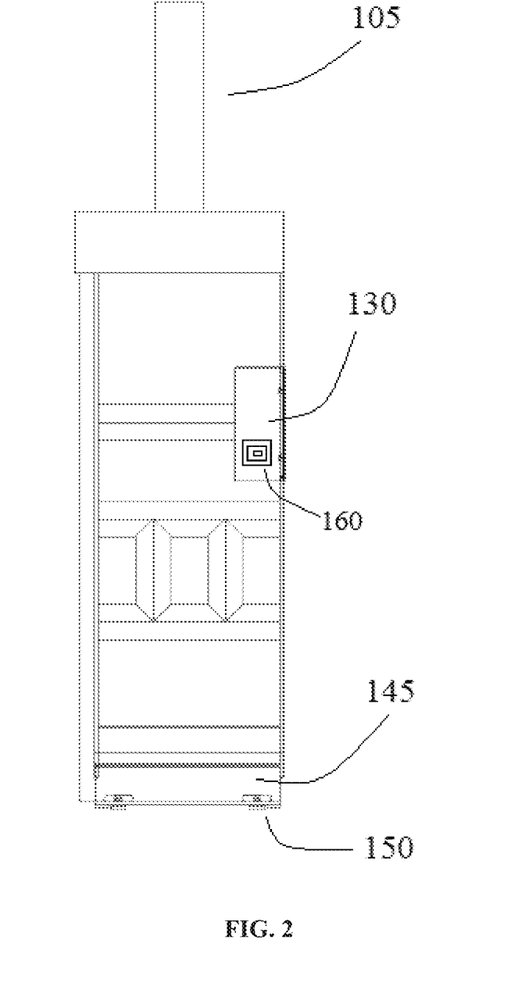
FIG. 2 shows a side view of an embodiment of a smart baler.
Figure 3:
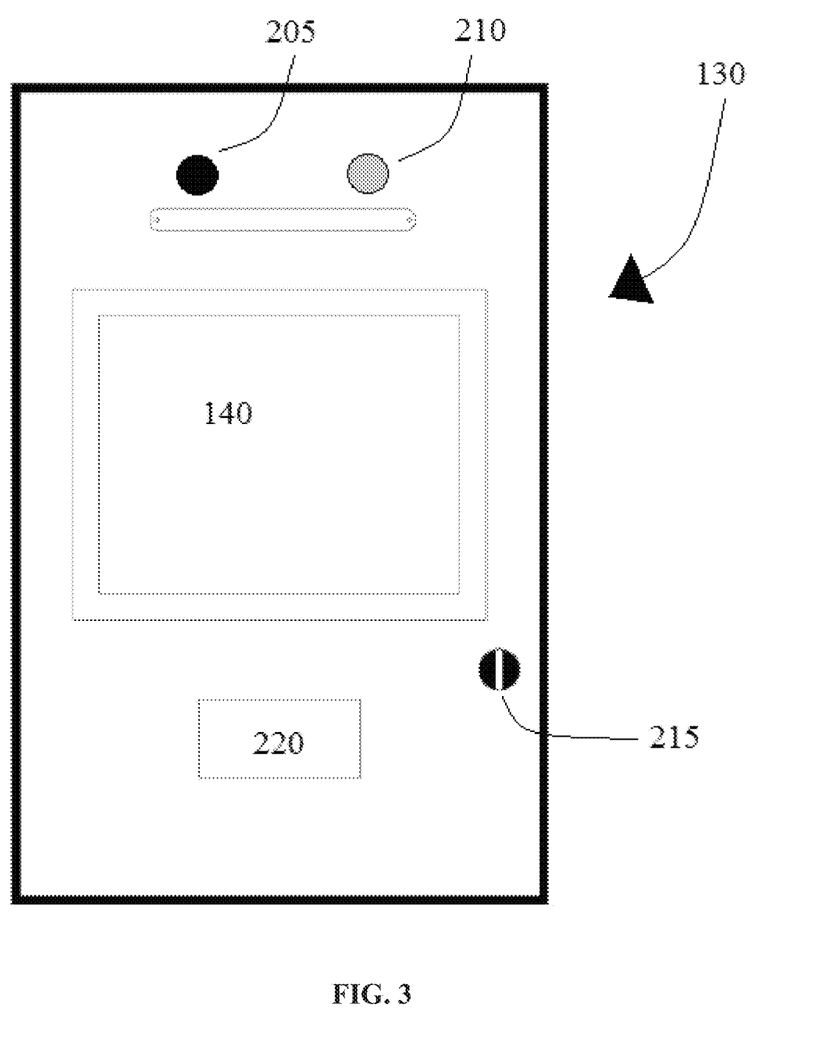
FIG. 3 depicts a potential embodiment of a smart control panel with weight indicator lights and a control panel.
Figure 4:
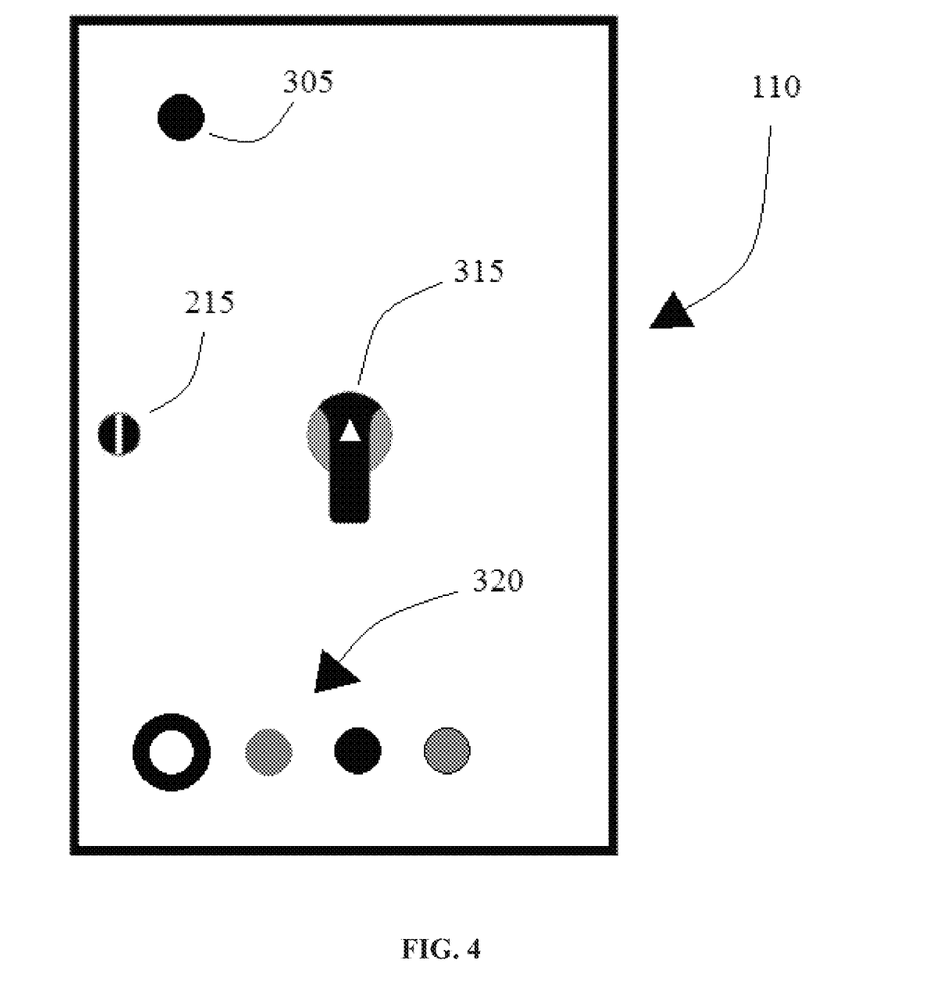
FIG. 4 depicts a potential embodiment of a traditional control panel for operating a baler.

Disclosed embodiments may also contain a separate or integrated smart control panel 130. The smart control panel 130 may house a computer processor 160 which may be operably connected to a scale 145, display screen 140, imaging device 170 such as a camera, other sensors and/or baler controls. Balers 101 are commonly anchored in place using mounting bolts 150 which may be arranged to orient the baler 101 in a fixed level position. Some disclosed embodiments will provide a minimum weight indicator 205 and a maximum weight indicator 210. Embodiments may also contain a separate or integrated weight display 220 which provides the operator with the current weight of the material being baled.

Disclosed embodiments address a wide array of concerns by incorporating sensors, imaging devices 170, computers 160, and balers 101 in order to increase the amount and reliability of data collected. The sensors detect the weight of a finished bale and, in some embodiments, the data is pushed to a cloud database. Additionally, a local computer 160 may capture weight data as well as images of the product baled and the finished bale. The local computer 160 will be attached to an input device 165 which allows the operator to input data that may not be readily detectable by certain embodiments. The input device 165 will commonly be a keyboard or touch pad, but a mouse, track pad, magnetic card reader, barcode scanner, RFID reader, QR reader or other computer input device 165 may also be used.

Embodiments will also comprise a printer 175. The printer 175 will commonly be a label printer. The label printer 175 may print up to all known data regarding a bale and may also encapsulate this data in the form of a tracking device 180 such as a barcode, QR Code or RFID chip. An operator can attach the printed label to the finished bale, thereby ensuring that an accurate record of the bale information accompanies the bale through each step of the recycling chain. In preferred embodiments, the label printer 175 will print onto adhesive stickers so that the labels may be quickly adhered to the bales or bale wrapper without the need for an additional attachment mechanism.

The addition of a tracking device 180 such as a barcode allows for fast and accurate inventory when bales are moved from trucks or other transition points in the recycling chain or possibly moved between storage areas. Certain preferred embodiments use an RFID or other near-field labeling technology to label each bale with some or all of the collected data relating to the bale. This can greatly facilitate accurate inventory control. If RFID chips are used to label each bale, a truck or storage location equipped with an RFID reader can tally each bale moved into and out of the truck or storage location with minimal human involvement.

By centralizing all of this data in a single point or database, such as a cloud database, a coordinated and detailed analysis of all recyclable materials for a given enterprise can be created and maintained with relatively little human input. This data may also be accessible at any time and/or from any location by logging into the database. This big data approach to managing recyclable materials allows for the identification of inefficiencies at both individual baling stations as well as enterprise wide operations. All of this data may be initially collected using disclosed embodiments of a baler 101 with integrated or associated sensors.

An alternative embodiment of the disclosed invention is a retro-fit of an existing traditional baler such as a Mil-Tek baler, compactor or crusher or any other existing baling device. A scale 145 or other weighing device may be incorporated into an existing baler. This scale 145 can be operably connected to a processor 160 which can automatically record the weight of the bale as well as the other data discussed throughout. Imaging devices 170 such as a camera can also be operably connected to the processor 160. The camera can be configured to take pictures of the finished bale as well as the material being loaded into the baler 101 in order to confirm that operator accurately identified the material being baled. In some embodiments, computer vision techniques may be used in order to determine the start time and completion time of each bale as well as the other data discussed throughout. The processor 160 can be operably connected to a printer 175, such as a label printer, which prints labels displaying all of the necessary information for efficient tracking and management of each bale as well as efficient management of baling operations at the operator, location, region and/or enterprise level. The processor 160 may be connected to a database, cloud or otherwise, and record all of the collected data in the database for further analysis as discussed throughout. The end result of a retro-fit traditional baler may be similar in capabilities to the disclosed smart baler 101 depending on the specific equipment incorporated and the arrangement of that equipment. Various distinct situations may require more or less incorporated equipment depending on the specific conditions.

Smart Baler Example

When raw recyclable materials are delivered to a baling location, a human operator initially enters his personal identifier (such as an employee number) and the type of material being baled into a computer 160 using an input device 165. The computer 160 will note the start time for the bale. The operator then begins the process of feeding material into the baler 101. Once the bale has reached a minimum predetermined weight threshold, the smart baler 101 notifies the operator. This may be accomplished using minimum weight indicator 205, or any other notification device, such as an audible device or a visual indicator. The operator can then complete the bale or add additionally material to the bale as long as the bale does not exceed a maximum predetermined weight threshold. The operator may observe the weight display 220 in order to facilitate adding the appropriate amount of material. Some embodiments will display the current weight of the bale in real time in order to assist the operator. If the operator exceeds the predetermined amount of material, maximum weight indicator 210 or any other notification device, such as an audible device or a visual indicator may alert the operator to the situation. Certain embodiments of the baler 101 may physically or otherwise block the operator's ability to load more material once a predetermined threshold has been met in order to facilitate a more consistent bale weight.

Once an operator has determined that the predetermined criteria to stop feeding material into the baler 101 for a particular bale have been met, the operator will stop feeding material into the baler. At this point, in a preferred embodiment, the baler door 120 will open so that the bale may be completed using baling wire, twine, plastic wrap, or other known materials for tying, binding and/or completing a bale. Once the bale is completed, the computer 160 will note the end time of the bale and automatically weigh the bale. An integrated camera 170 may also take at least one image or picture of the completed bale. This may be used to confirm that the operator correctly entered information such as the type of material being baled. In some embodiments, a camera 170 may also take periodic pictures of the material as it is being fed into the baler 101. In a potential embodiment, computer vision techniques may be used to analyze pictures of the material being loaded and/or pictures of the complete bale in order to automatically confirm that the operator correctly identified the material being baled. In certain embodiments, an alarm or other notification may alert the operator if the computer vision system determines that the material being baled has not been correctly identified. In additional embodiments, the computer vision system may make an independent determination of the material being baled and record that information with the other collected data related to a particular bale.

The label printer 175 is configured to automatically print a label in response to the bale being completed or may print a label in response to a command by the operator. The label identifies at least the weight of the bale and the type of material from which the bale is made. The label may also include a unique bale identifier as well as any and all other information related to the bale that has been collected. The label printer 175 may print this information in a format readable by a human operator, and/or may print a machine readable code such as a barcode or QR code which is correlated with all of the stored data related to that baler 101. In some embodiments, the label printer 175 may also use RFID chips to identify the bale and all of the gathered data related to the bale.

Once completed, the bale may be removed to either on-site storage or loaded onto a truck for transportation or further processing depending on the particular circumstances.

The collected data related to a particular bale may be used in combination with other collected data and information to analyze the productivity of the smart baler 101, the operator and/or the enterprise across many diverse metrics. For example, the average length of time it takes any particular operator to load a bale of a particular material may be calculated. This time may be compared with other operators at the same location and/or different locations. That information may be used to increase efficiency, manage staff and/or identify the most and least productive employees. If a single operator works at multiple locations, comparing his average bale time at each location may reveal logistical issues that allow the operator to work more or less efficiently at a given location.

The collected data could also be used to determine which materials may be formed into bales faster and slower. This analysis could be used to guide the enterprise towards focusing on the recyclable material that has a higher resale value and lower cost of producing the bale both in terms of man hours and equipment necessary. The collected data could also be combined with additional sources of information in order to identify market and pricing information. This analysis may be used in order to prioritize which materials are recycled and/or make decisions regarding what to do with baled materials.

The person of ordinary skill in the art will understand that the above examples are only a few of the many possible metrics that can be analyzed. There are many additional metrics and procedures that may be analyzed once a sufficient amount of data has been collected.

Data collected may relate to company, region, and/or branch ID; machine ID; employee ID; operator ID; bale ID; product type; bale image; bale count; bale type; bale minimum and maximum weight allowed; date and time a bale is made; bale weight, type of material being recycled, source of the material being recycled, bale start time, bale completion time, baler inactivity start and end time; baler inactivity duration; location of the smart baler, time and date the bale was made, bale weight, and/or all relevant baler settings. All collected data may further be aggregated, analyzed, and compared in order to generate additional data for further analysis.

Additionally, any step in the recycling process which requires human data recording or reporting may be automated, thereby preventing human error or falsification of records. All collected data may be stored locally but will, preferably, be pushed to a cloud or other database where it can be aggregated and further analyzed. Most preferably, this data will be push to a remote database in real time, facilitating the management of enterprise level recycling operations and allowing for the optimization of each step in the recycling chain.

Disclosed embodiments relate to an apparatus for baling materials comprising a baler 101 for compressing and/or baling recyclable materials, a scale 145 with digital signal output, a processor 160 operably connected to said scale 145, and an input device 165 operably connected to said processor 160. Certain embodiments may also comprise at least one digital camera 170, wherein the digital camera 170 is operably connected to the processor 160 and/or a label printer 175, wherein the label printer 175 is operably connected to the processor 160. In certain embodiments, the label printer 175 may be configured to dispense a radio frequency identification tags.

In some preferred embodiments, the processor 160 is configured to transfer data to a remote database. That database is preferably cloud based.

In some embodiments, the processor 160 is programmed to notify the operator if the scale signal is outside of a predetermined range.

Certain embodiments will also comprise a display screen 140. The display screen 140 may be designed to display collected data, information relating to the current bale, information relating to the maintenance status of the baler 101 such as hydraulic fluid level hydraulic fluid pressure, electric voltage, motor speed, and/or other diagnostic information. The display screen 140 may also show the date prior maintenance operations were performed such as the date of the previous oil filter change, lubrication of the chains and/or hinges, inspection and/or tightening of mounting bolts, inspection and/or maintenance of the piston, motor, electrical system and/or hydraulic system. The display screen 140 may also or alternatively show the date of the next required maintenance. The display 140 may also display operational information such as the time since last bale was started or finished, the number of bales produced in a day and/or week. In preferred embodiments, the display screen 140 may be a touch screen and may also function as an input device 165. In some embodiments, the display screen 140 will be operably connected to the processor 160.

Figure 5:
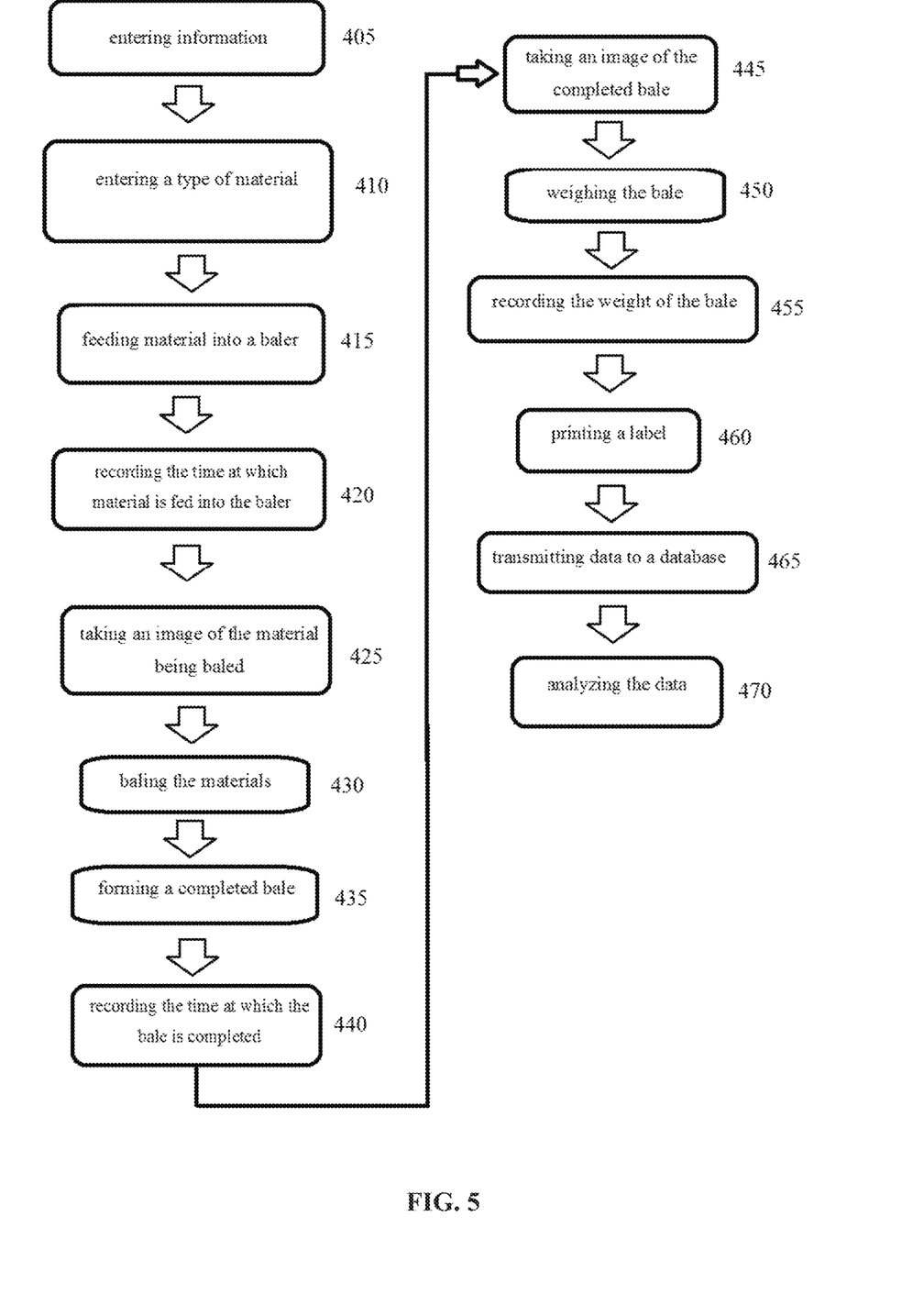
FIG. 5 depicts a potential method of baling material.

Other embodiments relate to a method for baling recyclable materials, the method comprising the steps of entering information 405, entering a type of material 410, feeding material into a baler 415, recording the time at which material is fed into the baler 420, taking an image of the material being baled 425, baling the material 430, forming a completed bale 435, recording the time at which the bale is completed 440, taking an image of the completed bale 445, weighing the bale 450, recording the weight of the bale 455, printing a label 460, transmitting data to a database 465, analyzing the data 470. The information entered may be any information related to the operator, baler, material being baled, company, location, organization, including but not limited to all of the information and/or data discussed throughout.

Certain embodiments of the disclosed methods include feeding recyclable materials into a baler 101, wherein the baler 101 is operably connected to a processor 160; baling the materials, thereby forming a completed bale; weighing the bale automatically using a digital scale 145 operably connected to the processor 160; recording the weight of the bale automatically; and printing a label which displays the recorded weight of the bale.

Certain embodiments also comprise the steps of entering an operator identification or other information into the processor using an associated input device; entering the type of recyclable material being fed into the baler 101, automatically recording the time at which material is initially fed into the baler 101 and the time at which the completed bale is formed; and/or automatically transmitting the data associated with a bale to a remote database.

Still other embodiments relate to equipment for retrofitting a traditional baler with smart baler technology. The equipment may comprise at least one scale 145 configured to weigh a bale; a processor 160 operably connected to said scale 145, wherein the processor 160 is configured to transfer data to a database; an input device 165 operably connected to said processor 160 and a printer 175 operably connected to said processor 160.

Figure 6A:
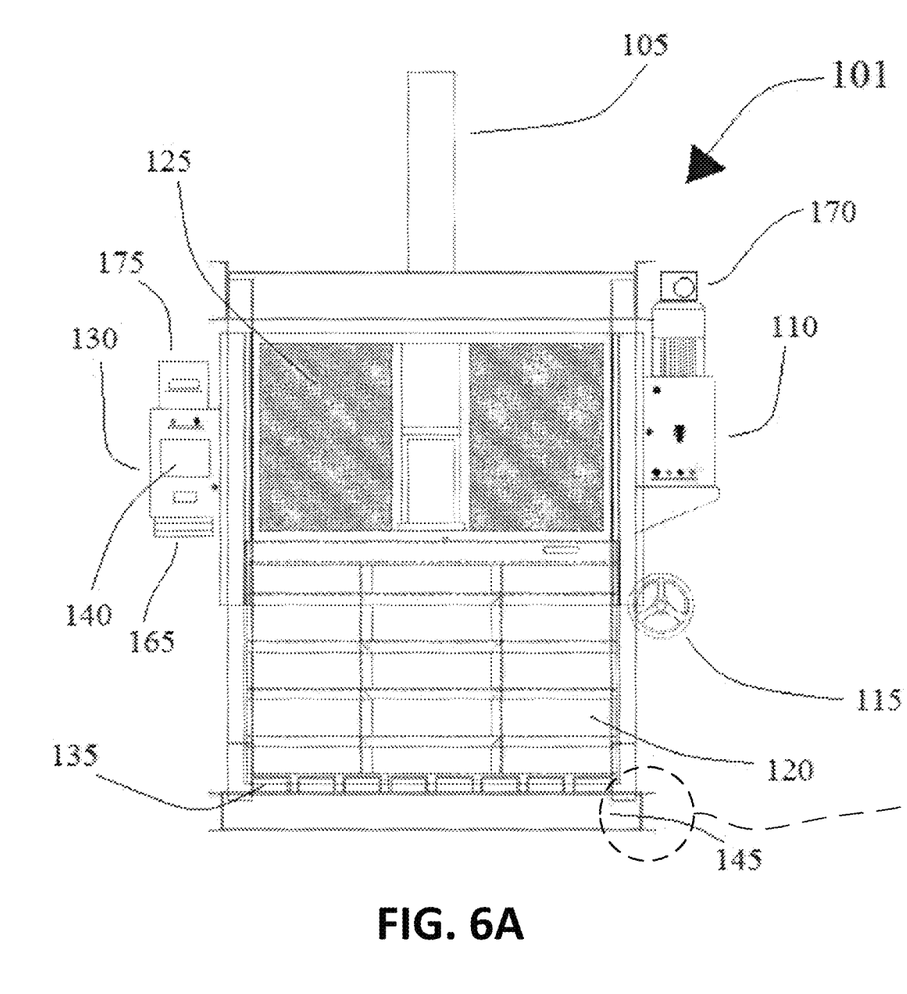
FIGS. 6A and 6B show a front view of an embodiment of a smart baler and a side view of a portion of the scale of the smart baler of FIG. 6A where certain this embodiment comprises a frame designed to elevate a traditional baler and allow the scale to be positioned lower than the traditional baler and/or an imaging device operably connected to said processor.
Figure 6B:
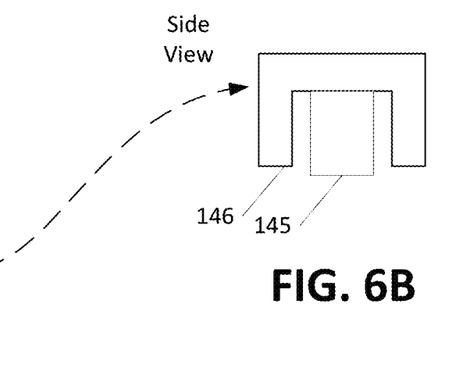

Certain embodiments may also comprise a frame 146 designed to elevate a traditional baler and allow the scale 145 to be positioned lower than the traditional baler and/or an imaging device 170 operably connected to said processor 160.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A retrofit kit for a traditional baler comprising: a scale with digital signal output configured to weigh a bale and output a scale signal to a processor which is operably connected to said scale; an input device operably connected to said processor; a cloud based database operably connected to the processor; a printer operably connected to the processor; an imaging device operably connected to the processor; wherein the processor is configured to transfer data to the cloud based database and wherein the printer is configured to print a label which displays the weight of the bale or dispense a radio frequency identification tag associated with the weight of the bale; and wherein the imaging device and the processor are configured to identify the start time and completion time of each bale.

2. The apparatus of claim 1, wherein the processor is configured to notify the operator if the scale signal is outside of a predetermined range.

3. The apparatus of claim 1, further comprising a display screen.

4. The apparatus of claim 1, wherein the input device is configured to transfer an operator identification to the processor using an associated input device.

5. The apparatus of claim 1, wherein the imaging device and the processor are configured to identify the type of material being fed into the baler.

6. The apparatus of claim 1, wherein the processor is configured to transfer the weight of a bale to the cloud based database.

* * * * *